UNITED STATES PATENT OFFICE.

BLANCHE RAY, OF CITRONELLE, ALABAMA.

EGG SUBSTITUTE AND METHOD OF MAKING IT.

1,154,805.  Specification of Letters Patent.  Patented Sept. 28, 1915.

No Drawing.  Application filed March 11, 1915.  Serial No. 13,688.

*To all whom it may concern:*

Be it known that I, BLANCHE RAY, a citizen of the United States, residing at Citronelle, in the county of Mobile and State of Alabama, have invented a new and useful Egg Substitute and Method of Making It, of which the following is a specification.

The composition consists of yams preferably of that type known commercially as "Dooley yams" and a suitable flavoring extract such as rose.

In preparing the composition, the yams are boiled until completely cooked after which they are peeled and cut into thin slices. These slices are baked until crisp within a slow oven after which they are converted into a fine powder to which the flavoring extract is added. It is the practice to use approximately two drops of rose extract with each tablespoonful of powder produced as above pointed out.

It has been found that a composition such as herein described constitutes an efficient substitute for eggs in making puddings, cakes, muffins, corn bread and the like, one tablespoonful of the composition being equal in value to one egg.

What is claimed is:—

1. The herein described composition of matter for use as an egg substitute, comprising yams successively boiled, baked and pulverized, and a flavoring agent, substantially in the proportions stated.

2. The herein described method of producing an egg substitute, which consists in peeling yams, boiling them until thoroughly cooked, then drawing them in a slow oven until crisp, then pulverizing the dried yams, and finally adding a flavoring agent to the powdered substance.

In testimony that I claim the foregoing as my own, I have hereto affixed my signature in the presence of two witnesses.

BLANCHE RAY.

Witnesses:
 JAS. S. LYNCH,
 HOWARD M. ALLEN.

Copies of this patent may be obtained for five cents each, by addressing the "Commissioner of Patents, Washington, D. C."